(12) United States Patent
Bian et al.

(10) Patent No.: US 12,372,720 B2
(45) Date of Patent: Jul. 29, 2025

(54) OPTICAL POWER SPLITTERS INCORPORATING ONE OR MORE SPIRAL ELEMENTS

(71) Applicant: GlobalFoundries U.S. Inc., Malta, NY (US)

(72) Inventors: Yusheng Bian, Ballston Lake, NY (US); Roderick Alan Augur, Saratoga Springs, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 333 days.

(21) Appl. No.: 18/109,294

(22) Filed: Feb. 14, 2023

(65) Prior Publication Data
US 2024/0272359 A1 Aug. 15, 2024

(51) Int. Cl.
*G02B 6/12* (2006.01)
*G02B 6/122* (2006.01)
*G02B 6/125* (2006.01)
*G02B 6/13* (2006.01)

(52) U.S. Cl.
CPC ........... *G02B 6/125* (2013.01); *G02B 6/1228* (2013.01); *G02B 6/13* (2013.01); *G02B 2006/12061* (2013.01); *G02B 2006/12147* (2013.01); *G02B 2006/1215* (2013.01)

(58) Field of Classification Search
CPC .......... G02B 6/125; G02B 6/128; G02B 6/13; G02B 2006/12061; G02B 2006/12147; G02B 2006/1215

USPC .......................................................... 385/14
See application file for complete search history.

(56) References Cited

U.S. PATENT DOCUMENTS

| | | | | |
|---|---|---|---|---|
| 5,835,458 | A * | 11/1998 | Bischel | G11B 7/1353 369/44.29 |
| 10,468,849 | B1 * | 11/2019 | Bradley | H01S 3/163 |
| 11,079,544 | B2 | 8/2021 | Bian et al. | |
| 11,353,654 | B2 | 6/2022 | Bian | |
| 2003/0070833 | A1 * | 4/2003 | Barth | H05K 1/118 174/250 |
| 2006/0104592 | A1 * | 5/2006 | Jenkins | G02B 6/3596 385/140 |

OTHER PUBLICATIONS

T. Chrysostomidis et al., "480 Gbps WDM Transmission Through an Al2O3:Er3+ Waveguide Amplifier," in Journal of Lightwave Technology, vol. 40, No. 3, pp. 735-743, 1 Feb. 1, 2022, doi: 10.1109/JLT.2021.3121467.
W. Jin et al., "Ultra-low frequency noise spiral-cavity hybrid-integrated laser," 2022 Conference on Lasers and Electro-Optics (CLEO), San Jose, CA, USA, 2022, pp. 1-2.
(Continued)

*Primary Examiner* — Jerry M Blevins
(74) *Attorney, Agent, or Firm* — Thompson Hine LLP; Anthony Canale (57) ABSTRACT

Structures for an optical power splitter and methods of forming a structure for an optical power splitter. The structure comprises a spiral waveguide core having an outer perimeter. The structure further comprises a plurality of waveguide cores. Each waveguide core has a section disposed adjacent to the outer perimeter of the spiral waveguide core.

20 Claims, 6 Drawing Sheets

(56) References Cited

OTHER PUBLICATIONS

Matteo Cherchi et al., "Chiral spiral waveguides based on MMI crossings: theory and experiments", Proceedings vol. 9752, Silicon Photonics XI, 975215 (Mar. 14, 2016); https://doi.org/10.1117/12.2210945, 7 pages.

Botter R et al., "Guided-acoustic stimulated Brillouin scattering in silicon nitride photonic circuits." Sci Adv. Oct. 7, 2022;8(40):eabq2196. doi: 10.1126/sciadv.abq2196. Epub Oct. 7, 2022. PMID: 36206345; PMCID: PMC9544327.

European Patent Office, Extended European Search Report and Opinion issued in European Patent Application No. 23190713.0 on Jan. 16, 2024; 9 pages.

W. Bogaerts et al., "Silicon-on-Insulator Spectral Filters Fabricated With CMOS Technology," in IEEE Journal of Selected Topics in Quantum Electronics, vol. 16, No. 1, pp. 33-44, Jan.-Feb. 2010, doi: 10.1109/JSTQE.2009.2039680.

Harish Subbaraman, Xiaochuan Xu, Amir Hosseini, Xingyu Zhang, Yang Zhang, David Kwong, and Ray T. Chen, "Recent advances in silicon-based passive and active optical interconnects," Optics Express 23, 2487-2511 (2015).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

B. Peng et al., "A Cmos Compatible Monolithic Fiber Attach Solution with Reliable Performance and Self-alignment," In Optical Fiber Communication Conference (OFC) 2020, OSA Technical Digest (Optica Publishing Group, 2020), paper Th3I.4.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.

Y. Bian et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020.9252280.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

Y. Bian et al., "3D silicon photonic interconnects and integrated circuits based on phase matching," 2021 IEEE 71st Electronic Components and Technology Conference (ECTC), 2021, pp. 2279-2284, doi: 10.1109/ECTC32696.2021.00357.

Y. Bian et al., "Light manipulation in a monolithic silicon photonics platform leveraging 3D coupling and decoupling," in Frontiers in Optics / Laser Science, B. Lee, C. Mazzali, K. Corwin, and R. Jason Jones, eds., OSA Technical Digest (Optica Publishing Group, 2020), paper FTu6E.3.

A. Aboketaf et al., "Towards fully automated testing and characterization for photonic compact modeling on 300-mm wafer platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper W6A.1.

Bian, Yusheng "Waveguide Absorbers" filed on May 6, 2022 as a U.S. Appl. No. 17/738,156.

Bian, Yusheng et al., "Photonic Integrated Circuit Including Plurality of Discrete Optical Guard Elements" filed on Sep. 16, 2022 as a U.S. Appl. No. 17/932,868.

* cited by examiner

OPTICAL POWER SPLITTERS INCORPORATING ONE OR MORE SPIRAL ELEMENTS

BACKGROUND

The disclosure relates to photonics chips and, more specifically, to structures for an optical power splitter and methods of forming a structure for an optical power splitter.

Photonics chips are used in many applications and systems including, but not limited to, data communication systems and data computation systems. A photonics chip may integrate optical components and electronic components into a unified platform. Among other factors, layout area, cost, and operational overhead may be reduced by the integration of both types of components on the same chip.

An optical power splitter is an optical component that is used in photonics chips to split optical power between multiple output waveguides based upon principles of multi-mode interference (MMI). Multiple multi-mode interference regions may be cascaded to build an optical power splitter having a single waveguide serving as an input channel and multiple waveguides serving as output channels. However, cascaded multi-mode interference regions increase the complexity of a photonics circuit, enlarge the footprint of an optical power splitter, and increase the variability in the splitting ratio.

Improved structures for an optical power splitter and methods of forming a structure for an optical power splitter.

SUMMARY

In an embodiment of the invention, a structure for an optical power coupler is provided. The structure comprises a spiral waveguide core having an outer perimeter. The structure further comprises a plurality of waveguide cores. Each waveguide core has a section disposed adjacent to the outer perimeter of the spiral waveguide core.

In an embodiment of the invention, a method of forming a structure for an optical power coupler is provided. The method comprises forming a spiral waveguide core that has an outer perimeter, and forming a plurality of waveguide cores. Each waveguide core has a section disposed adjacent to the outer perimeter of the spiral waveguide core.

BRIEF DESCRIPTION OF THE DRAWINGS

The accompanying drawings, which are incorporated in and constitute a part of this specification, illustrate various embodiments of the invention and, together with a general description of the invent ion given above and the detailed description of the embodiments given below, serve to explain the embodiments of the invention. In the drawings, like reference numerals refer to like features in the various views.

DETAILED DESCRIPTION

Figure 1:
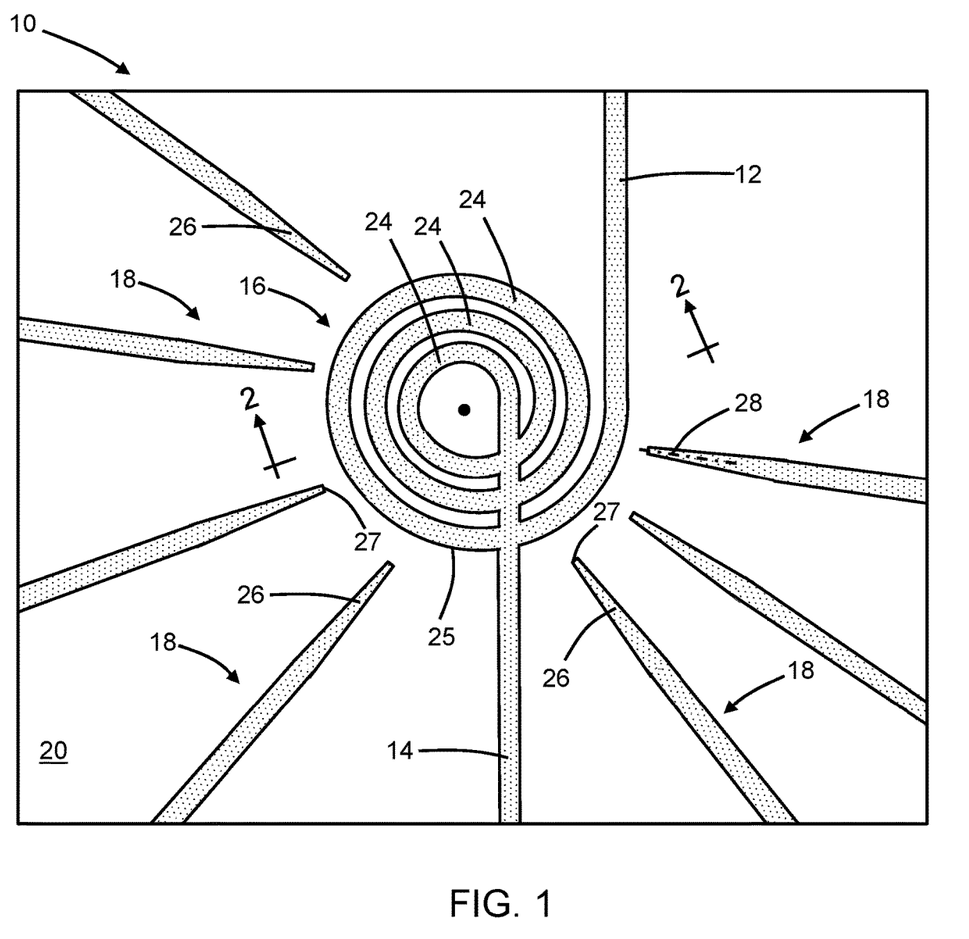
FIG. 1 is a top view of a structure at an initial fabrication stage of a processing method in accordance with embodiments of the invention.
Figure 2:
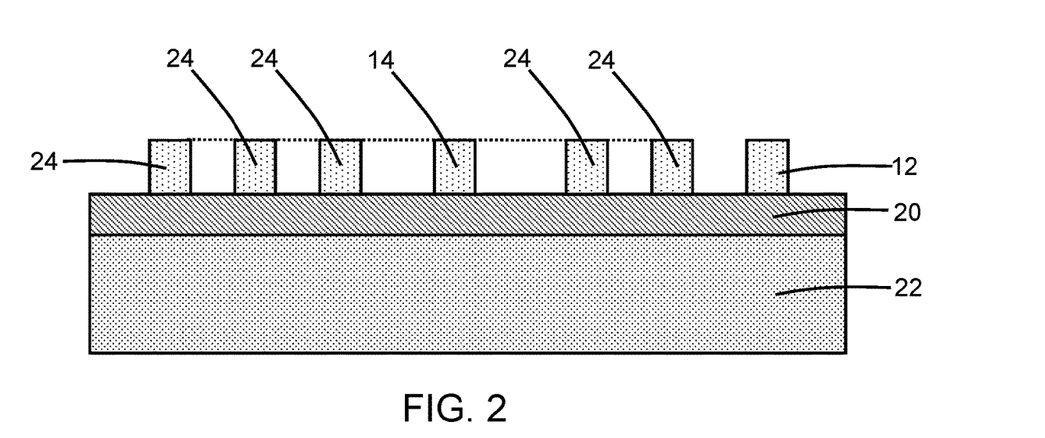
FIG. 2 is a cross-sectional view taken generally along line 2-2 in FIG. 1.

With reference to FIGS. 1, 2 and in accordance with embodiments of the invention, a structure 10 for an optical power splitter includes a waveguide core 12, a waveguide core 14, a spiral waveguide core 16 that connects the waveguide core 12 to the waveguide core 14, and waveguide cores 18 that are spaced from the spiral waveguide core 16. The waveguide cores 12, 14, 16, 18 are positioned on, and over, a dielectric layer 20 and a semiconductor substrate 22. In an embodiment, the dielectric layer 20 may be comprised of a dielectric material, such as silicon dioxide, and the semiconductor substrate 22 may be comprised of a semiconductor material, such as single-crystal silicon. In an embodiment, the dielectric layer 20 may be a buried oxide layer of a silicon-on-insulator substrate, and the dielectric layer 20 may be disposed between the waveguide cores 12, 14, 16, 18 and the semiconductor substrate 22. The dielectric layer 20 may function as a lower cladding layer for the waveguide cores 12, 14, 16, 18.

In an embodiment, the waveguide cores 12, 14, 16, 18 may be comprised of a material having a refractive index that is greater than the refractive index of silicon dioxide. In an embodiment, the waveguide cores 12, 14, 16, 18 may be comprised of a semiconductor material. In an embodiment, the waveguide cores 12, 14, 16, 18 may be comprised of single-crystal silicon. In an embodiment, the waveguide cores 12, 14, 16, 18 may be comprised of polysilicon or amorphous silicon. In an embodiment, the waveguide cores 12, 14, 16, 18 may be comprised of a dielectric material, such as silicon nitride, silicon oxynitride, or aluminum nitride. In alternative embodiments, other materials, such as a polymer or a III-V compound semiconductor, may be used to form the waveguide cores 12, 14, 16, 18.

In an embodiment, the waveguide cores 12, 14, 16, 18 may be formed by patterning a layer comprised of their constituent material with lithography and etching processes. In an embodiment, an etch mask may be formed by a lithography process over the layer to be patterned, and unmasked sections of the deposited layer may be etched and removed by an etching process. In an embodiment, the waveguide cores 12, 14, 16, 18 may be formed by patterning the semiconductor material (e.g., single-crystal silicon) of a device layer of a silicon-on-insulator substrate. In an embodiment, the waveguide cores 12, 14, 16, 18 may be formed by patterning a deposited layer comprised of their constituent material (e.g., silicon nitride, polysilicon, or amorphous silicon). In an embodiment, the waveguide cores 12, 14, 16, 18 may be disposed within the same plane.

In an embodiment, the spiral waveguide core 16 may include a set of spiral elements 24 defining concentric nested turns that are continuously wound in a spiral about a center point. The spiral elements 24 of the spiral waveguide core 16 may wind around the center point at a continuously decreasing radius from the center point. In an embodiment, the spiral waveguide core 16 may be mathematically characterized as an Archimedean spiral. In an embodiment, the spiral waveguide core 16 may be an Archimedean spiral that is characterized by spiral elements 24 that are evenly spaced independent of radius from the center point. The spiral waveguide core 16 may have an outer perimeter 25. In an embodiment, the outer perimeter 25 of the spiral waveguide core 16 may be defined by the outer radius of the outermost spiral element 24. In an embodiment, the spiral elements 24 of the spiral waveguide core 16 may have a uniform or substantially uniform width over the length of the spiral.

In an embodiment, each spiral element 24 may have a circular shape. In alternative embodiments, each spiral element 24 may have a non-circular shape, such as oblong, rectangular, or square. In alternative embodiments, the spiral elements 24 may include a combination of different shapes. In an alternative embodiment, the spiral elements 24 may be divided into segments that are dimensioned and positioned at small enough pitch so as to define a sub-wavelength grating, and the gaps between the segments may be subsequently filled with dielectric material to define a metamaterial structure.

The waveguide core 12 may provide an input for light into an end of the spiral waveguide core 16 of the optical power splitter. In an embodiment, the waveguide core 12 may be coupled to an end of the outermost spiral element 24 of the spiral waveguide core 16. In an embodiment, each waveguide core 18 may include a section in the representative form of a taper 26 that is positioned adjacent to the outer perimeter 25 of the spiral waveguide core 16. Each taper 26 may extend along a longitudinal axis 28 and may terminate at an end 27. Each taper 26 may have a width dimension that increases with increasing distance from the end 27. The tapers 26 may receive light that is transferred from the spiral waveguide core 16, and the waveguide cores 18 may route the transferred light to other optical components on the photonics chip.

The tapers 26 of the waveguide cores 18 are disposed at different positions adjacent to, and spaced apart about, the outer perimeter 25 of the spiral waveguide core 16. In an embodiment, the spiral waveguide core 16 may output light at spaced-apart locations that are distributed about the outer perimeter 25. In an embodiment, the tapers 26 of the waveguide cores 18 may be placed adjacent to the locations about the outer perimeter 25 at which the spiral waveguide core 16 outputs light. The splitting ratio for each waveguide core 18 may be determined by, among other parameters, the separation between the end 27 of the associated taper 26 and the outer perimeter 25 and the position of the taper 26 about the outer perimeter 25. In an embodiment, the tapers 26 of the waveguide cores 18 may be spaced about the outer perimeter 25 to provide splitting ratios that are equal or substantially equal. In an embodiment, the tapers 26 of the waveguide cores 18 may be spaced about the outer perimeter 25 to provide splitting ratios that are different. In an embodiment, the longitudinal axis 28 of each taper 26 may be aligned perpendicular to a tangent at a point on the outer perimeter 25 of the spiral waveguide core 16. In an alternative embodiment, the longitudinal axis 28 of each taper 26 may be aligned at an acute angle relative to a point on the outer perimeter 25 of the spiral waveguide core 16. In an embodiment, the waveguide cores 18 may number four or more.

The waveguide core 14 may provide an output for light from an end of the spiral waveguide core 16 of the optical power splitter. In an embodiment, the waveguide core 14 may be coupled to the innermost spiral element 24 of the spiral waveguide core 16. The waveguide core 14 may be used to direct residual light out of the spiral waveguide core 16 that is not transferred from the spiral waveguide core 16 to the waveguide cores 18. The waveguide core 14 may intersect the spiral elements 24 along its outward path. In an alternative embodiment, the waveguide core 14 may be omitted from the structure 10.

In an alternative embodiment, the spiral waveguide core 16 may include a single spiral element 24 that winds around the center point at a continuously decreasing radius from the center point. The waveguide core 12 may be coupled to one end of the single spiral element 24 and the waveguide core 14 may be coupled to the opposite end of the single spiral element 24.

Figure 3:
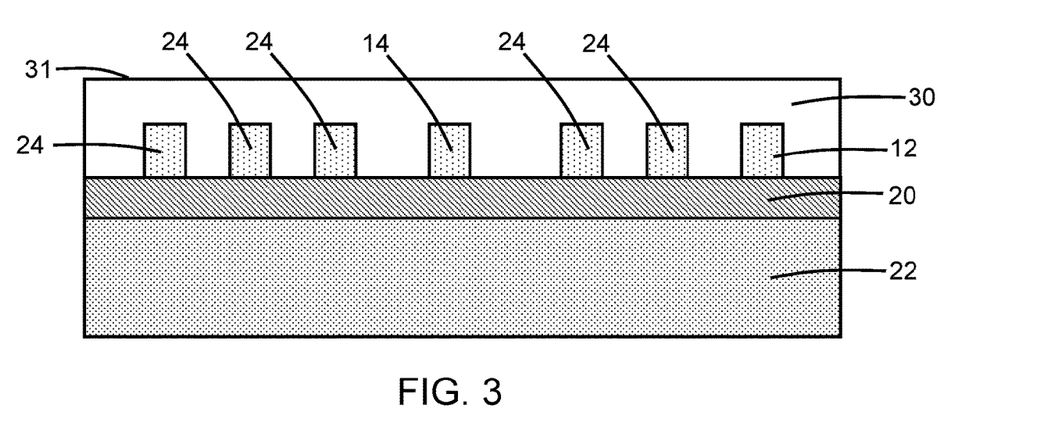
FIG. 3 is a cross-sectional view of the structure at a fabrication stage subsequent to FIGS. 1, 2.

With reference to FIG. 3 in which like reference numerals refer to like features in FIGS. 1, 2 and at a subsequent fabrication stage, a dielectric layer 30 is formed on, and over, the waveguide core 12, the waveguide core 14, the spiral waveguide core 16, and the waveguide cores 18. The dielectric layer 30 may be comprised of a dielectric material, such as silicon dioxide, having a refractive index that is less than the refractive index of the material constituting the waveguide cores 12, 14, 16, 18. The dielectric layer 30 may have a top surface 31, the waveguide cores 12, 14, 16, 18 may be embedded in the dielectric layer 30, and the dielectric layer 30 may have a thickness greater than a height of the waveguide cores 12, 14, 16, 18.

In use, light (e.g., laser light) may be guided on a photonics chip by the waveguide core 12 to the spiral waveguide core 16 of the optical power coupler. Light propagating in the spiral waveguide core 16 is transferred with respective splitting ratios from the spiral waveguide core 16 to the tapers 26 and directed by the waveguide cores 18 away from the optical power splitter. The light coupling between the spiral waveguide core 16 and the tapers 26 of the waveguide cores 18 may be characterized as free space coupling. In an embodiment, light may also exit the optical power splitter via the waveguide core 14.

The structure 10 provides an optical power splitter of reduced complexity and footprint in comparison with optical power splitters that include cascaded multi-mode interference regions. In that regard, the spiral elements 24 of the spiral waveguide core 16 may reduce the space needed on the photonics chip to construct an optical power splitter due to the compactness of the spiral shape. In addition, the optical power splitter provided by the structure 10 may decrease the variability in the splitting ratio.

Figure 4:
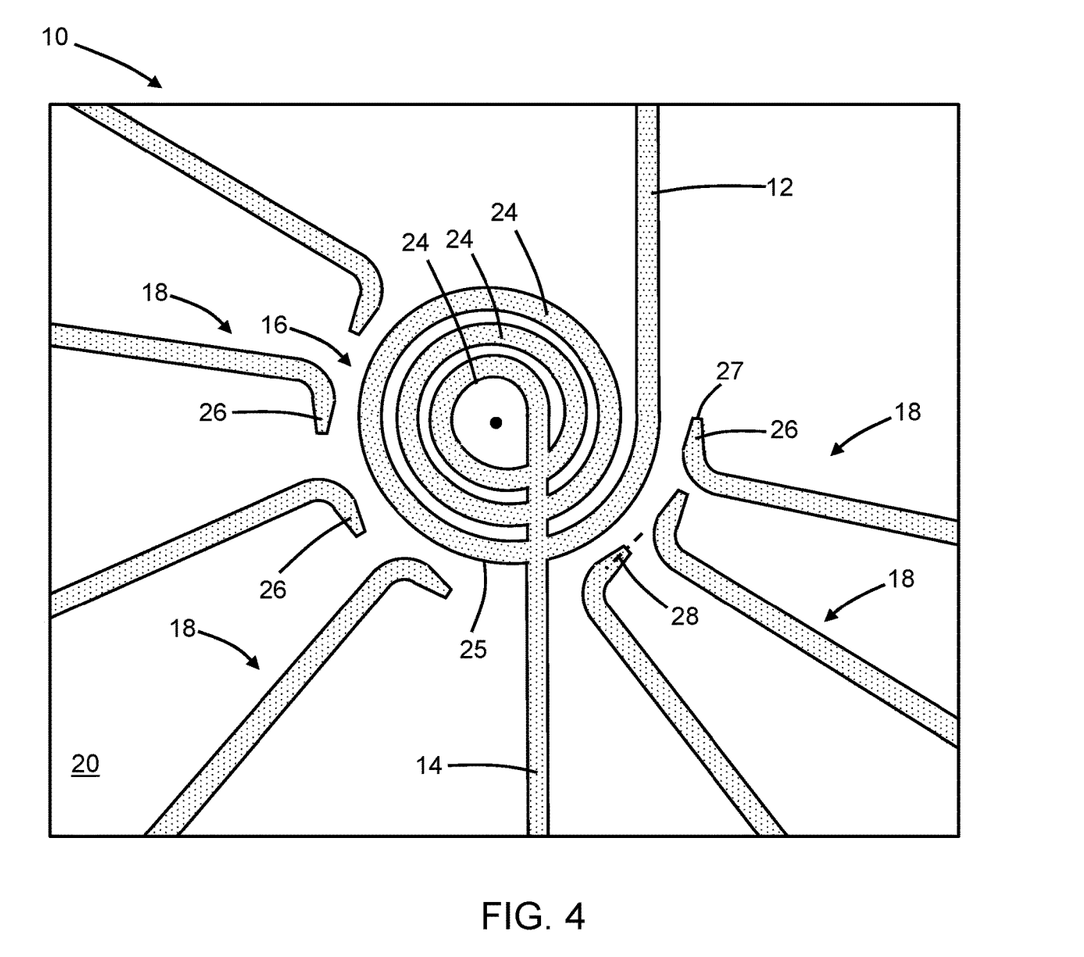
FIG. 4 is a top view of a structure in accordance with alternative embodiments of the invention.

With reference to FIG. 4 and in accordance with alternative embodiments, the taper 26 of each of the waveguide cores 18 may be oriented such that the longitudinal axis 28 is aligned tangential to a point on the outer perimeter 25 of the spiral waveguide core 16. The dimensions of the tapers 26 and the gaps between the tapers 26 and the outer perimeter 25 may be selected to provide adiabatic light coupling. Each waveguide core 18 may include a bend that is configured to route the waveguide core 18 away from spiral waveguide core 16.

Figure 5:
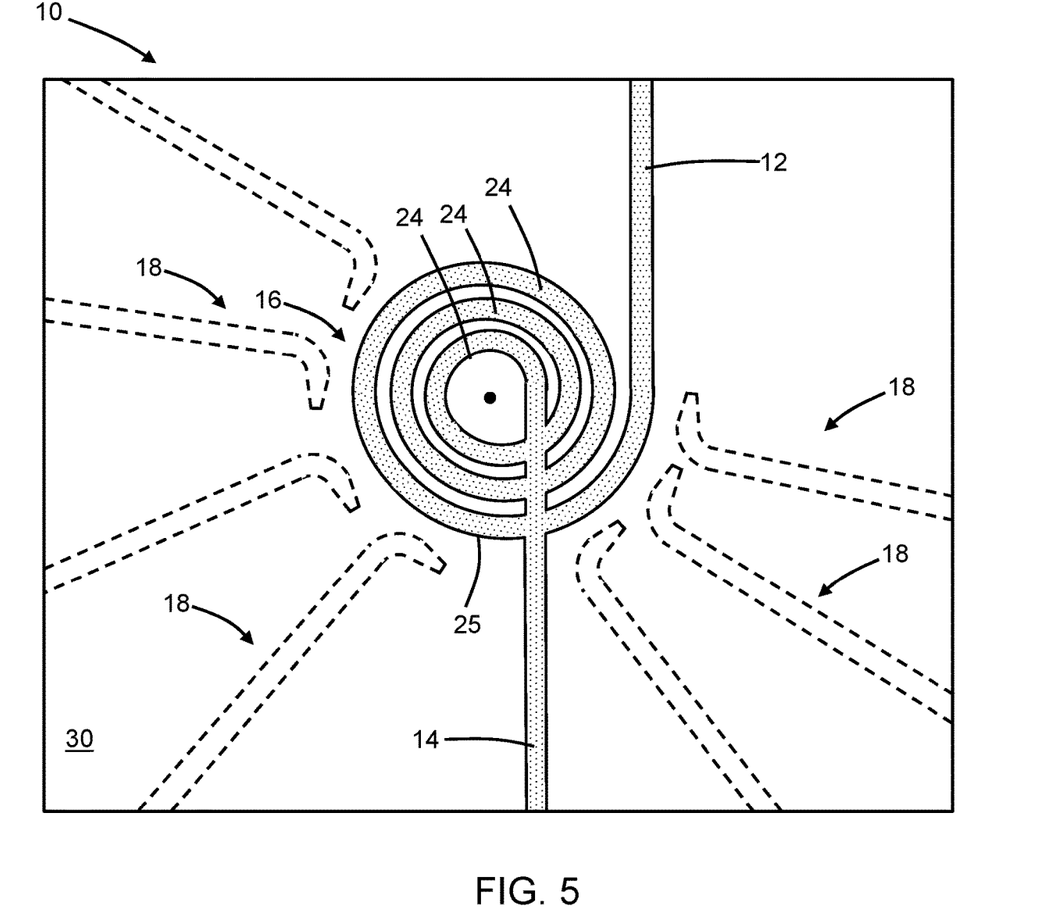
FIG. 5 is a top view of a structure in accordance with alternative embodiments of the invention.
Figure 6:
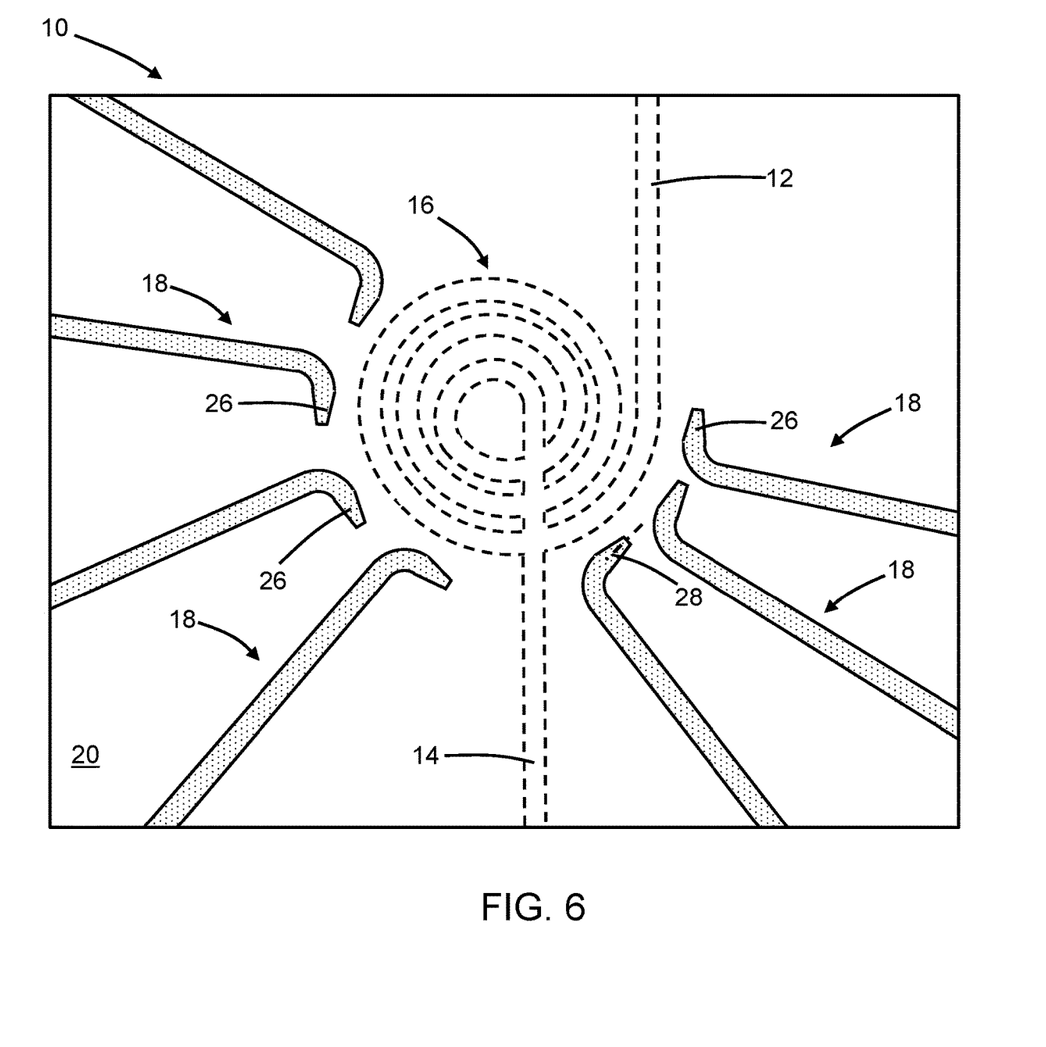
FIG. 6 is a top view of a structure in accordance with alternative embodiments of the invention.

With reference to FIG. 5 and in accordance with alternative embodiments, the waveguide cores 18 may be arranged in a different elevation or level of the structure 10 than the waveguide core 12, the waveguide core 14, and the spiral waveguide core 16. Specifically, the waveguide cores 12, 14, 16 may be disposed on the dielectric layer 30 in a level that is above the level containing the waveguide cores 18. The waveguide cores 18 are positioned in a vertical direction between the semiconductor substrate 22 and the waveguide cores 12, 14, 16. The waveguide cores 18 may be comprised of a different material than the waveguide cores 12, 14, 16. In an embodiment, the waveguide cores 12, 14, 16 may be comprised of a dielectric material, such as silicon nitride, and the waveguide cores 18 may be comprised of silicon. With reference to FIG. 6 and in accordance with alternative embodiments, the waveguide cores 18 may be arranged in a different elevation or level of the structure 10 than the waveguide core 12, the waveguide core 14, and the spiral waveguide core 16. Specifically, the waveguide cores 18 may be disposed on the dielectric layer 30 in a level that is above the level containing the waveguide cores 12, 14, 16. The waveguide core 12, 14, 16 are positioned in a vertical direction between the semiconductor substrate 22 and the waveguide cores 18. The waveguide cores 18 may be comprised of a different material than the waveguide cores 12, 14, 16. In an embodiment, the waveguide cores 18 may be comprised of a dielectric material, such as silicon nitride, and the waveguide cores 12, 14, 16 may be comprised of silicon.

Figure 7:
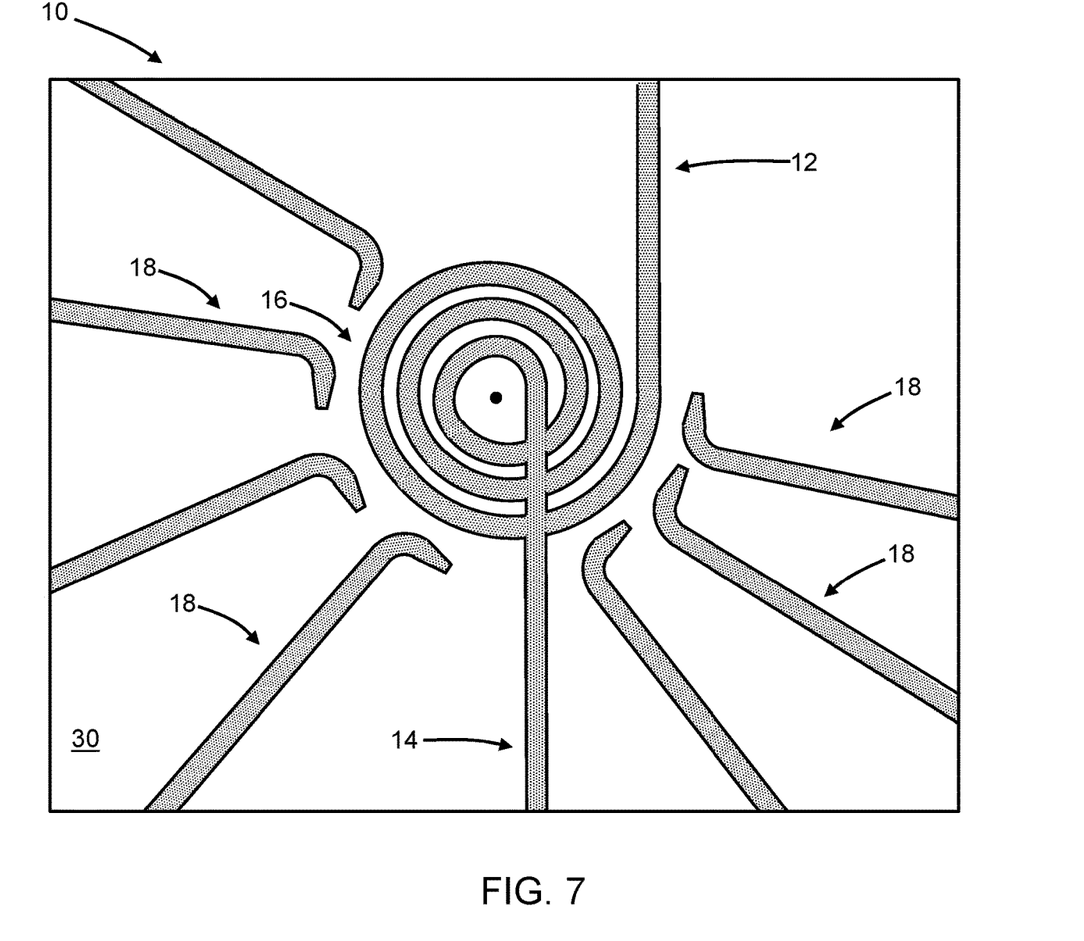
FIG. 7 is a top view of a structure in accordance with alternative embodiments of the invention.

With reference to FIG. 7 and in accordance with alternative embodiments, the waveguide cores 12, 14, 16, 18 may be multiple-layer stacked waveguide cores that include a lower layer of material (FIG. 1) and an upper layer of material (FIG. 7) stacked over the lower layer of material. The lower layer may be patterned and formed on the dielectric layer 20 as shown in FIG. 1, and the upper layer may be patterned and formed on the dielectric layer 30 as shown in FIG. 7. The lower layer may be separated from the upper layer by the dielectric material of the dielectric layer 30. In an embodiment, the lower and upper layers the waveguide cores 12, 14, 16, 18 may be comprised of different materials. In an embodiment, the lower layer of the waveguide cores 12, 14, 16, 18 may be comprised of silicon, and the upper layer of the waveguide cores 12, 14, 16, 18 may be comprised of silicon nitride.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an optical power coupler, the structure comprising:
 a spiral waveguide core including a plurality of spiral elements that are arranged in a spiral, the spiral elements including an outermost spiral element having an outer radius defining an outer perimeter of the spiral waveguide core; and
 a plurality of first waveguide cores, each of the first waveguide cores having a section disposed adjacent to the outer perimeter of the spiral waveguide core.

2. The structure of claim 1 further comprising:
 a second waveguide core connected to the outermost spiral element.

3. The structure of claim 1 wherein the spiral elements include an innermost spiral element, and further comprising:
 a second waveguide core connected to the innermost spiral element.

4. The structure of claim 1 wherein the spiral waveguide core and the first waveguide cores are disposed in the same plane.

5. The structure of claim 1 wherein the section of each of the first waveguide cores is a taper terminated by an end.

6. The structure of claim 5 wherein the taper of each of the first waveguide cores has a longitudinal axis that is aligned perpendicular to a tangent at a point on the outer perimeter of the spiral waveguide core.

7. The structure of claim 5 wherein the taper of each of the first waveguide cores has a longitudinal axis that is aligned tangential to a point on the outer perimeter of the spiral waveguide core.

8. The structure of claim 5 wherein the taper of each of the first waveguide cores has a longitudinal axis that is aligned at an acute angle relative to a point on the outer perimeter of the spiral waveguide core.

9. The structure of claim 1 wherein the spiral waveguide core comprises a first material, and the first waveguide cores comprise a second material different from the first material.

10. The structure of claim 9 wherein the first material is silicon, and the second material is silicon nitride.

11. The structure of claim 9 wherein the first material is silicon nitride, and the second material is silicon.

12. The structure of claim 1 wherein the spiral waveguide core and the first waveguide cores include a lower layer and an upper layer stacked over the lower layer, the upper layer comprises a first material, the lower layer comprises a second material different from the first material, and the lower layer is separated from the upper layer by dielectric material.

13. The structure of claim 12 wherein the spiral waveguide core comprises silicon, and the first waveguide cores comprise silicon nitride.

14. The structure of claim 1 further comprising:
a dielectric layer over the spiral waveguide core,
wherein the first waveguide cores are disposed on the dielectric layer.

15. The structure of claim 1 further comprising:
a dielectric layer over the first waveguide cores,
wherein the spiral waveguide core is disposed on the dielectric layer.

16. The structure of claim 15 wherein the spiral waveguide core comprises silicon nitride, and the first waveguide cores comprise silicon.

17. The structure of claim 1 wherein the first waveguide cores number four or more.

18. The structure of claim 1 wherein the spiral elements are continuously wound in the spiral with a continuously decreasing radius from the center point.

19. The structure of claim 18 wherein the spiral is an Archimedes spiral.

20. A method of forming a structure for an optical power coupler, the method comprising:
forming a spiral waveguide core including a plurality of spiral elements that are arranged in a spiral, wherein the spiral elements include an outermost spiral element having an outer radius defining an outer perimeter of the spiral waveguide core; and
forming a plurality of waveguide cores, wherein each waveguide core has a section disposed adjacent to the outer perimeter of the spiral waveguide core.

* * * * *